United States Patent [19]
Grimme, Jr. et al.

[11] 3,856,676
[45] Dec. 24, 1974

[54] WATER PURIFICATION AND VENDING APPARATUS

[75] Inventors: Henry L. Grimme, Jr., Parkville, Mo.; Ray Osborn, Overland Park, Kans.

[73] Assignee: Raypak, Inc., Westlake Village, Calif.

[22] Filed: Apr. 3, 1972

[21] Appl. No.: 240,535

[52] U.S. Cl.................. 210/96, 210/138, 210/152, 210/251, 210/259, 210/321, 210/433
[51] Int. Cl............................................ B01d 31/00
[58] Field of Search............. 210/257, 433, 259, 23, 210/321, 433, 96, 138, 251, 152; 222/20

[56] References Cited
UNITED STATES PATENTS

| | | | |
|---|---|---|---|
| 2,679,308 | 5/1954 | Moore et al. | 222/20 X |
| 3,115,822 | 12/1963 | Totten | 210/433 X |
| 3,355,382 | 11/1967 | Huntington | 210/321 X |
| 3,390,773 | 7/1968 | Merten | 210/321 X |
| 3,462,362 | 8/1969 | Kollsman | 210/321 X |
| 3,542,199 | 11/1970 | Bray et al. | 210/257 X |
| 3,552,566 | 1/1971 | Lowe et al. | 210/321 X |
| 3,684,094 | 8/1972 | Chamberlin et al. | 210/254 X |

*Primary Examiner*—Frank A. Spear, Jr.
*Attorney, Agent, or Firm*—Herzig & Walsh Incorporated

[57] ABSTRACT

Apparatus for purifying water taken from a well, municipal water system or other source including solids removal and then pressure filtration providing treated water and rejected water. A closed storage tank receiving treated water only, with controls for operation of the pressure filtration at intervals to maintain water in the storage tank between selected levels and periodic flushing of the pressure filtration, the flushing water being discharged to the disposal of the rejected water. A water dispensing station apparatus to move the water from the storage tank to the dispensing station. A purity sensor and controls permitting dispensing of only water meeting the purity requirements. Controls to stop operation and the dispensing of water in the event of any failure. A coin operated apparatus for controlling the dispensing for bulk vending of water.

7 Claims, 6 Drawing Figures

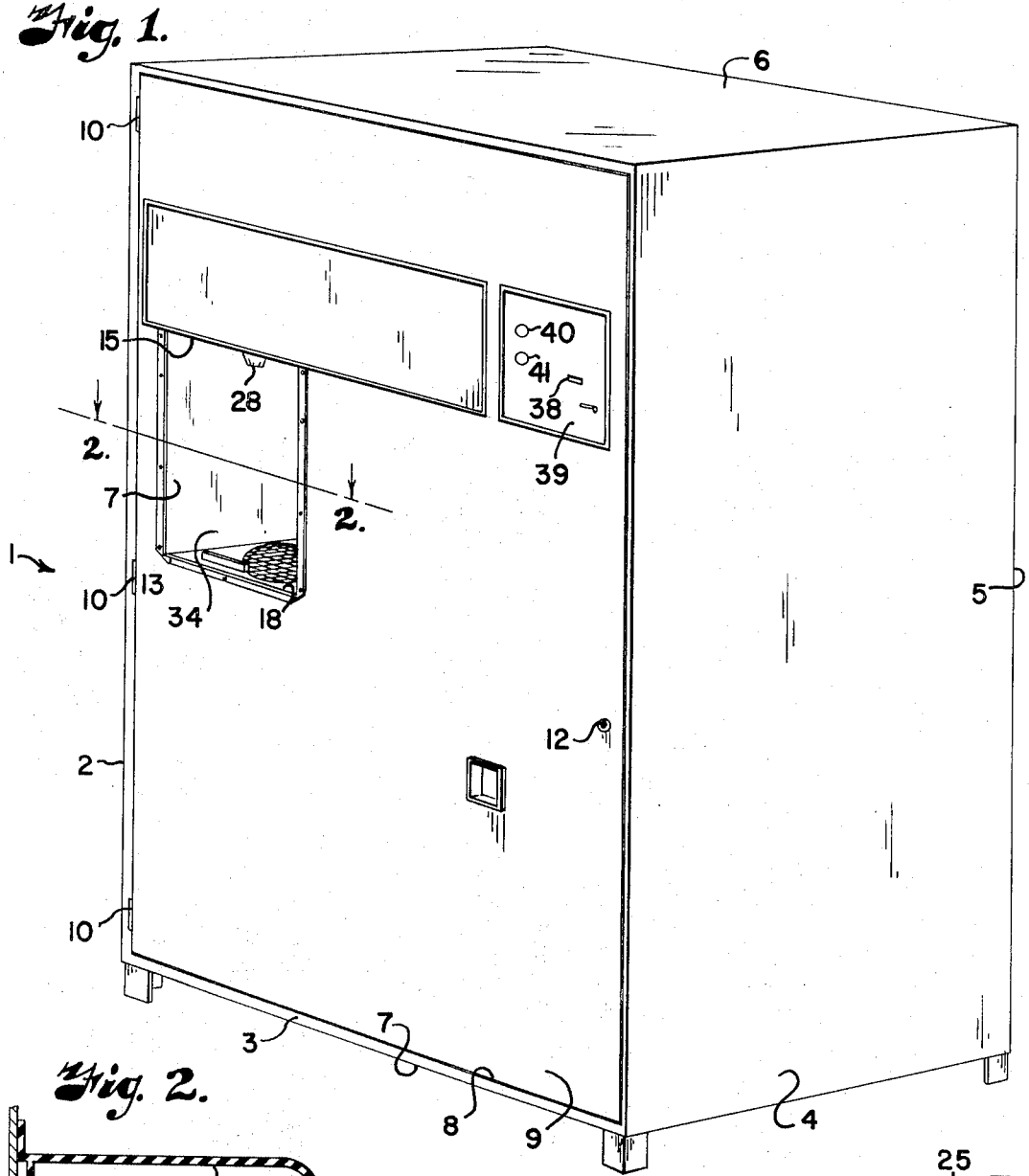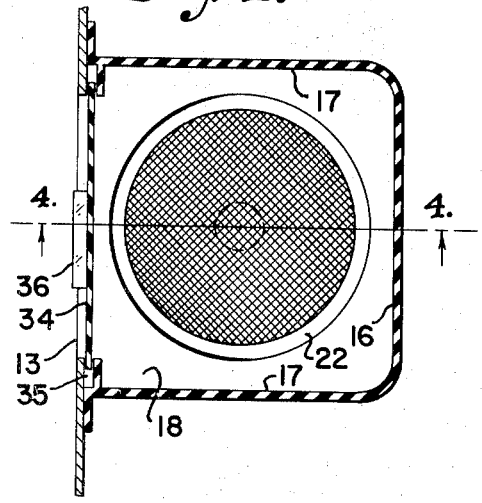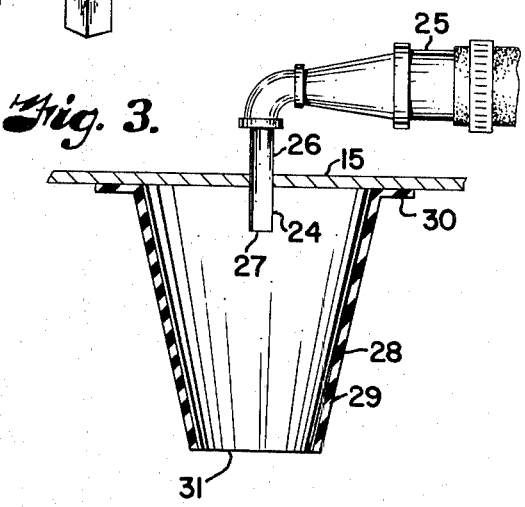

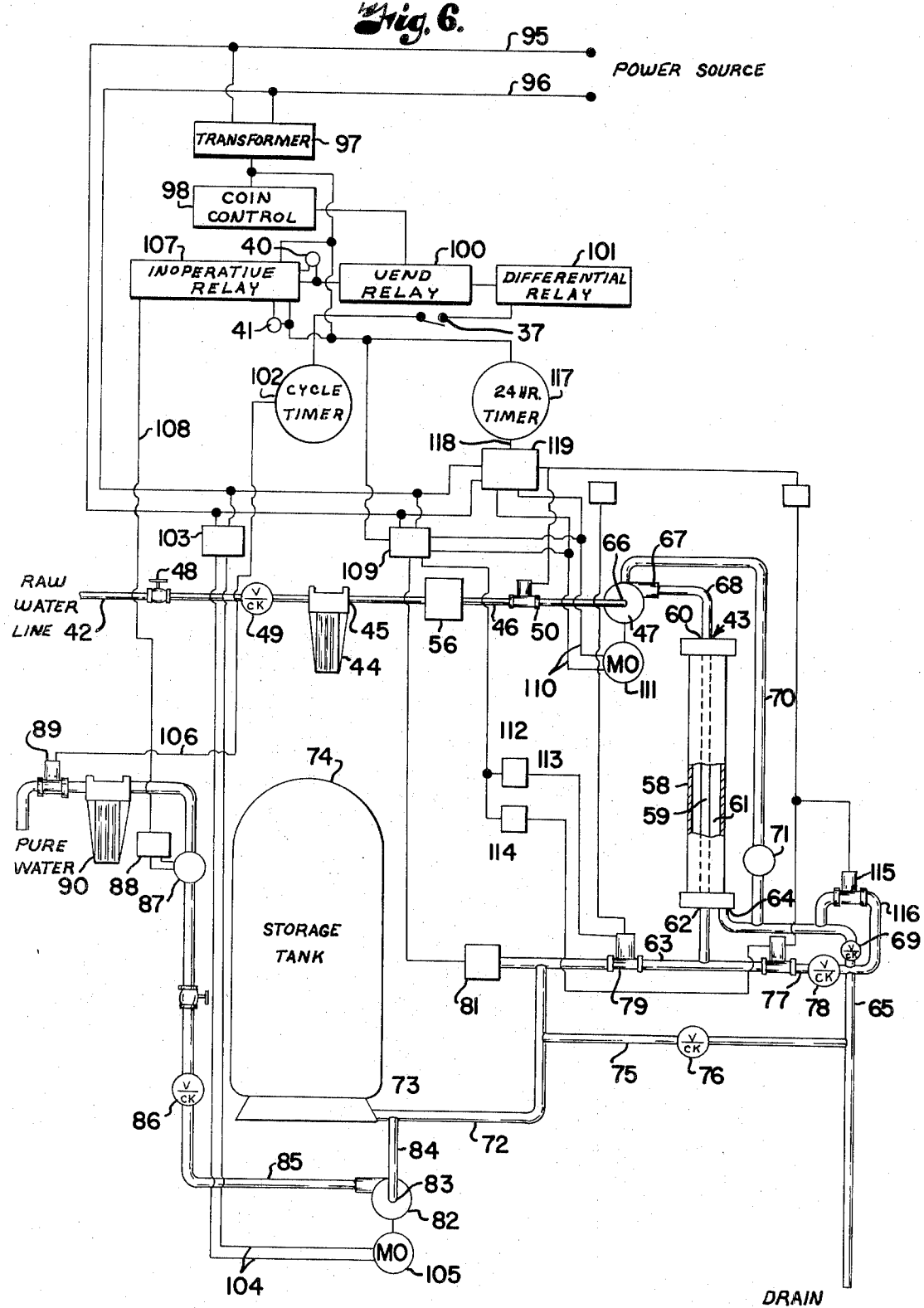

WATER PURIFICATION AND VENDING APPARATUS

This invention relates to water purification apparatus particularly for processing water for removing undesired minerals, organic materials and harmful ingredients and a vending apparatus for bulk vending of the treated water.

The principal objects of the present invention are to provide a substantially automatic bulk dispensing apparatus for treated water which can be contained in a relatively small area; to provide a liquid treating and dispensing apparatus that is compact and enclosed in a housing and located in any suitable place having a water source that can be provided with electric power; to provide such apparatus that is coin operated for bulk vending of treated water with control features for safe guarding the customer should a malfunction occur; to provide such an apparatus in which the water treatment includes a semi-permeable membrane filtration structure operating under pressure to pass filtered water and reject impurities including solids dissolved minerals, organics and other harmful ingredients; to provide such an apparatus with a closed storage tank for containing treated water and providing a supply for dispensing; to provide such an apparatus for processing water having chlorine therein as from a municipal water system and which removes impurities, dissolved minerals and the like with the treated water retaining a substantial portion of the original chlorine content; to provide such an apparatus wherein the water treated is protected to the time it is dispensed which includes means to render the dispensing apparatus ineffective if the water to be dispensed does not satisfy a preselected purity standard; to provide such an apparatus that is coin operated and that dispenses a preselected quantity of treated water in response to deposit of coins of a certain value; to provide a water treating apparatus within a housing that is compact, economical to operate and that provides clean water from which minerals, organics and other impurities are removed whereby it is of sufficient purity for drinking or other uses requiring substantially pure water; and to provide such a water vending apparatus which is of sturdy construction, pleasing appearance and capable of ready maintenance to maintain customer safeguards.

Other objects and advantages of this invention will become apparent from the following description taken in connection with the accompanying drawings wherein are set forth by way of illustration and example certain embodiments of this invention.

FIG. 1 is a perspective view of a water vending apparatus embodying features of the present invention.

FIG. 2 is an enlarged horizontal sectional view through the dispensing station taken on the line 2—2, FIG. 1.

FIG. 3 is an enlarged fragmentary sectional view through the water delivery and guard therefor.

FIG. 6 is a diagrammatic illustration of the water flow system of the apparatus and a diagrammatic illustration of the control system for the apparatus.

Figure 4:
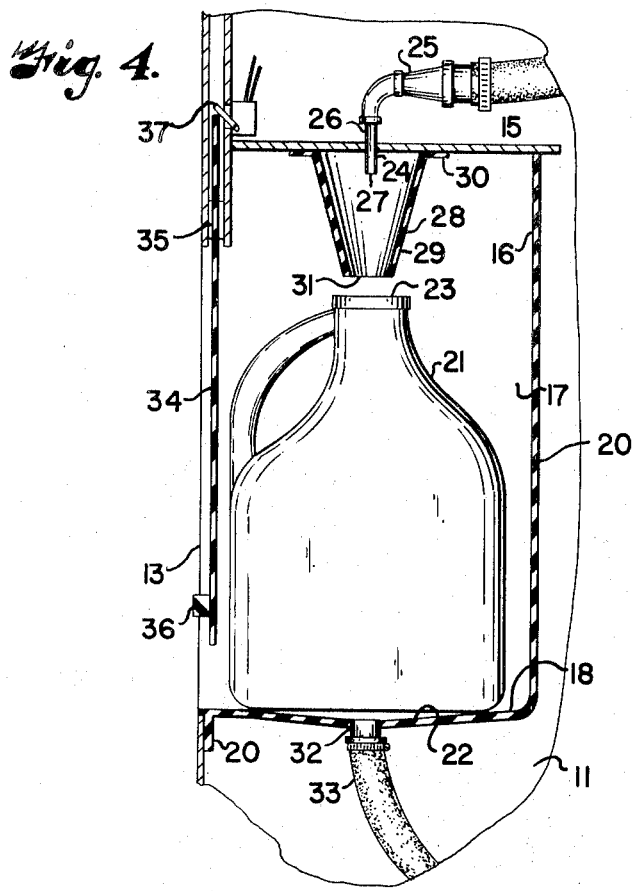
FIG. 4 is an enlarged fragmentary vertical sectional view through the dispensing station with a water receiving container positioned therein and the closing panel partially raised taken on the line 4—4, FIG. 2.
Figure 5:
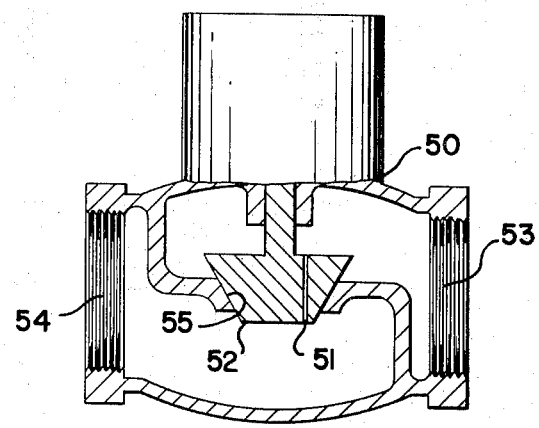
FIG. 5 is a sectional view through a control valve showing a continuous flow passage therein.

Referring more in detail to the drawings:

As required, detailed embodiments of the invention are disclosed herein, however, it is to be understood that these embodiments are merely exemplary of the invention, which may be embodied in many forms that are different from the illustrative embodiments presented herewith. Therefore, specific structural and functional details disclosed herein are not to be interpreted as limiting, but merely as a basis for the claims actually defining the scope of this invention.

The reference numeral 1 generally designates a water purification apparatus in a form for vending selected quantities of treated water. The apparatus 1 includes a housing 2 which is adapted to be secured on a support surface such as a floor or the like. The housing 2 has a front wall 3, side walls 4, rear wall 5, top wall 6 and bottom wall 7 all suitably secured to form a substantial housing that is sturdy and resists unauthorized entry. The front wall 3 has an opening 8 normally closed by a door 9 mounted for swinging movement by hinges 10 whereby the door may be opened to provide access to the equipment containing chamber 11. The door 9 and housing is preferably provided with a suitable lock 12 to normally hold the door in housing or cabinet closing position and permit access to the interior only by authorized persons.

The door 9 has an opening 13 to a dispensing station 14 which is in the form of a recess defined by top wall 15, rear wall 16, side walls 17, bottom wall 18. These walls may be secured to a separate support with the front arranged to provide access to the opening 13 in the door 9, however, in the illustrated structure, the side, top and bottom walls are suitably secured as by flanges 19 fastened to the inner surface of the door 9 whereby the structure defines a recess 20 that is separated from the interior of the cabinet by the walls 15 to 18 inclusive. The opening 13 is of a size to permit a container 21, such as a gallon jug to be inserted into the recess 20 and the bottom wall 18 preferably has a recessed portion 22 or other container engaging shoulders whereby the open top 23 of the container 21 is in vertical alignment with a water delivery spout or nozzle 24.

In the structure illustrated, a tubular duct or pipe 25 connected, as later described, to the treated water supply extends to above the top wall 15 and has a portion 26 extending therethrough terminating at an open end 27. Contact with the tube portion 26 and open end 27 is substantially prevented by guard 28 that surrounds the tube portion 26 and is spaced therefrom. In the structure illustrated, the guard 28 has a wall 29 in the shape of a cone with upper flanges 30 suitably secured to the top wall 15. The wall 29 extends downwardly in converging relation and teminates in an open end 31 spaced substantially below the open end 27 of the delivery pipe or tube portion 26 and is of a size to prevent foreign objects from being inserted upwardly and contacting the water delivery. The opening at the open end 31 of the guard is of such size that water flowing from the delivery tube to the container 21 does not contact the guard whereby the portions of the apparatus in contact with the water are always protected against contamination. The bottom wall 18 has a drain opening 32 providing communication with a duct 33 which extends downwardly and is adapted to be connected or discharge to a suitable drain or disposal system whereby any water or material collecting on the bottom wall of the dispensing station will flow to a disposal such as a sewer or the like.

The opening 13 is normally closed by a door or panel 34 preferably of transparent material whereby a view may be always had of the inside of the recess. In the structure illustrated, the panel 34 is mounted in vertical guides 35 and is provided with a handle 36 whereby the door or panel 34 may be raised to insert the container 21. A switch 37 connected in the electrical control system is positioned on the inside of the door 9 whereby the switch 37 is actuated upon starting of upward movement of the panel 34, said switch 37 being connected into the electrical control system, as later described, and being operative to interrupt the circuitry whereby the water delivery apparatus is inoperative when the panel 34 is raised. The switch 37 automatically returns to delivery operating position when the panel 34 is in the recess closing postion.

In the structure illustrated, a coin box 38 is provided for deposition of coins of a predetermined value to activate the apparatus to automatically deliver a selected quantity of treated water. In the structure illustrated, the coin box 38 is mounted on the door 9 with a face 39 exposed with the coin slots therein for receiving the coins. The coin mechanism is of conventional type, such as may be obtained from National Rejectors, Inc. or other commerical sources. It forms, per se, no part of the present invention but is so connected with the other components of the control system for operation of the apparatus with safeguards for the customer, as later described herein. The apparatus is also provided with suitable signal lights 40 and 41 which are preferably on the door 9 and which are designed to light up when a particular portion of the apparatus with which the light is associated is operative or inoperative, as will be later described.

FIG. 6 of the drawings diagrammatically illustrates the equipment and water flow thereof installed within the housing 2. A conduit 42 is adapted to be connected by means not shown to a raw water supply and serve as a raw water flow line to the treating system. The source of the raw water may be a municipal water system, a well or other source. The treating system includes a pressure filtration apparatus 43 of a type operating under presssure and adapted to pass filtered water and reject impurities including solids and dissolved minerals, organic material and other harmful ingredients. The raw water in the flow line 42 could flow directly to the pressure filtration apparatus, however, it is preferred that the water be subjected to a prefiltration to remove solids or particulate matter therefrom. In the structure illustrated, the flow line 42 delivers raw water to the inlet of a cartridge type filter 44 and the filtered water from said cartridge filter 44 flows from the outlet 45 thereof through a duct or flow line 46 to the inlet of a pump 47.

It is preferred to have controls of the water flow and in the structure illustrated a manually operated valve 48 is arranged in the flow line 42 said valve normally being open and closed only to shut off all water as when servicing the apparatus. A check valve 49 such as a ball check is arranged down stream from the valve 48 and is operative to prevent back flow of water from the treating system toward the water source said check valve opening with a minimum of operating pressure, as for example 10 pounds per square inch. A control valve 50 is arranged in the flow line 46 up stream from a pump 47 said valve 50 is preferably of the solenoid type operated by the control circuitry for flow of row water through the pump 47 when required. It is desired have a small flow or trickle of water pass the valve 50. When the valve is in flow closing position, this small trickle could be provided by a bypass around the valve 50, however, in the structure illustrated, the bypass is provided by a small orifice 51 in the valve member 52 whereby the trickle of water will flow from the inlet 53 to the outlet 54 of the valve when the valve member 52 is engaged with the valve seat 55 in closed position.

A pressure sensor 56 is arranged in the flow line and is associated with the prefilter to provide a continual pressure check and is connected into the circuitry whereby if the pressure drop across the prefilter 44 indicates the cartridges is clogged the control circuitry is interrupted to prevent operation of the pump 47. The pressure sensor may be in the form of a vacuum switch arranged in the flow line 46 to interrupt the circuit to the motor in the event the water supply is inadequate. The pressure filter structure 43 is a membrane module having a pressure vessel or shell 58 with a membrane assembly 59 therein arranged whereby water to be treated delivered to an inlet 60 is presented on one side of the membrane of the membrane assembly and the other side communicates with a collector area 61 that has communication through an outlet 62 to a treated water flow line 63. The shell 58 has an outlet 64 connected with a flow line 65 for discharge of reject water.

The membrane assembly utilizes a membrane providing a desired pressure passage of clean water therethrough and rejecting or preventing passage of impurities such as dissolved minerals, insecticide or detergent residues, organic material, bacteria and other pollutants. Suitable membranes are polyamid membrane, cellulose acetate membrane and the like, the membrane being such that it provides reverse osmosis. The raw water supply from the flow line 46 is delivered to the inlet 66 of a high pressure pump 47 having a discharge 67 connected by a pressure line 68 to the inlet 60 of the pressure vessel or shell 58. The raw water is applied under high pressure, as for example, a pressure from 50 to 1500 pounds per square inch to the membrane assembly. The clean water passes through the membrane and is collected in the area 61 and flows from the shell through the outlet 62 into the flow line 63. The rejected water and impurities is delivered through the discharge outlet 64 to the flow line 65 for flow to a sewer or other waste disposal. It is preferrable to recycle a portion of the reject water, the line 65 has a flow control valve 69 for controlling the flow of the reject water to the sewer. A return line 70 communicates with the line 65 between the shell 58 and the valve 69 and leads to the inlet of the pump 47. The return line has a flow controller valve 71 whereby the operation of the flow control for valves 69 and 71 can control the portion of the reject water that is recycled and the portion that is sent to waste disposal.

The flow line 63 communicates with a line 72 that is connected to and delivers treated water to the lower portion 73 of a closed storage tank 74. The line 72 has a connection with a bypass line 75 which discharges into the line 65 leading to a drain or sewer. A check valve 76 is arranged in the line 75 and permits flow therethrough only at high pressure, as for example, over 100 pounds per square inch. The flow line 63 also is connected with a line 77 which leads to the waste line 65, said line 77 having a check valve 78 therein opening at low pressure, as for example, ten pounds per square inch. Flow from the line 63 to the lines 72 and 77 is suitably controlled by valves, for example, a valve 79 in line 63 and a valve 80 in the line 77 upstream from the check valve 78. The valve 80 normally being open and closing only for delivery of treated water to the tank 74, as later described.

When the pump 47 is operating to supply water to be treated or cleaned to the storage tank 74 the clean water flows through the line 63, valve 79, line 72 to the storage tank 74. The storage tank is preferably a pressurized tank whereby the water moved by the pump through the membrane 59 and to the storage tank 74 has substantially no possibility of air entrainment. Also, the reverse osmosis or filtration through the membrane removes forty to sixty percent of the chlorine content of the raw water and the water delivered to the storage tank is under pressure whereby the remaining chlorine is retained therein and does not escape as it might in an open tank and said retained chlorine provides the continuing protection against impurities being in the treated water. A tank level control 81 is associated with the storage tank and is responsive to the level of water therein and is connected into the circuitry whereby when the water in the tank reaches a predetermined low level the circuitry is actuated to open the valve 50 and energize the pump 47 whereby additional water is forced through the membrane assembly with the clean water being delivered to the tank 74. This operation continues until the level reaches a predetermined high at which time the level controller 81 causes a control circuitry to interrupt the circuit to the valve 50 and the pump 47 to effect stopping of that operation.

The storage tank 74 provides the treated water for dispensing. Any suitable means of withdrawing the treated water from the storage tank and delivering it to the discharge nozzle 24 or end of the duct 26 could be used, as for example, the pressure in the storage tank 74 could provide the propelling force for the delivered water. It is desired to meter the water allowable a predetermined quantity will be delivered. In the structure illustrated, a pump 82 has its inlet 83 connected by a line 84 to the line 72 adjacent the storage tank 74 to draw water therefrom. The pump 82 discharges the clean water into a delivery line 85 that is connnected to the tubular dispensing line 25. A suitable check valve such as a ball valve 86 is arranged in the line 85 to prevent any back flow. A purity probe 87 is connected to the line 85 to sense the purity of the water passing therethrough. In the event the total dissolved soilds in the water passing through the flow line 85 exceeds a predetermined maximum, as for example, 150 parts per million, the probe activates a control apparatus, as for example a conductivity control 88 to actuate the control circuitry to interrupt the operation of the pump 82 and close a control valve such as a solenoid valve 89 in the delivery line. It is preferred that the treated water pass through a final filter 90 such as a charcoal filter of the cartridge type.

With a supply of clean water in the storage tank 74 and the apparatus in operation, the coin control box 38 is connected to a power source, shown as lines 95 and 96, preferably through a transformer 97 whereby the controlls operate on a lower voltage circuit, as for example, 24 volts. Depositing of the required coin value in the coin box is adapted to provide a circuit through a coin control 98 and a line 99 to a vend relay 100, a differential relay 101 to designate the quantity to be delivered, a cycle timer 102, to a motor control relay 103 which closes the circuit through lines 104 to a motor 105 driving the pump 82. The cycle timer also for the same time provides a circuit through a line 106 to normally close solenoid valve 89 whereby when the motor 105 of pump 82 is energized the valve 89 is also opened. The circuit to the motor 105 is controlled whereby the pump 82 will deliver a predetermined quantity of water. The cycle timer 102 is an example such a control and is arranged to interrupt the circuit to the motor and the valve 89 after a predetermined interval during which the pump will pump the predetermined quantity of water as indicated by the value of the coins deposited. It is preferred that there be a light 40 that is connected into the circuitry to indicate that the system is operative. In the event the system is not operative, as for example, if the purity probe 87 senses a solid mineral content above a predetermined maximum, the conductivity control apparatus 88 is operatively connected to a relay 107 through a line 108 and actuates same opening switch to the power source to shut down the operation and this also energizes a signal light 41 to indicate that the system is inoperative.

With this system in operation the switch 37 actuated by the panel 34 is in the circuit to the vend relay 96 whereby the energization of the motor 105 and the opening of the valve 89 is prevented until the panel is in closed position, said switch 37 being between the differential relay 101 and the cycle timer 102 whereby the timer does not start until the panel 34 is in closed position. With the power source connected the circuit is completed through the tank level control sensor 81 and a water supply relay 109 with the water level in the storage tank 74 at a predetermined low level, the controller 81 actuates the relay 109 to provide a circuit through lines 110 to a motor 111 for the pump 47 to energize same. It also provides a circuit to the control valve 50 whereby when the motor 111 is energized the solenoid valve 50 is also open for flow of the raw water from the source through the prefilter 44 to the pump 47 to supply the water under pressure to the filtration system 43. A circuit is also provided through a line 112 relays 113 and 114 controlling soleniod valves 79 and 80 respectively. After the pump 47 is started the valve 80 remains open and the valve 79 remains closed for a predetermined time, as for example 60 seconds, so water in the area 61 of the filtration unit 43 is discharged to a drain. Then after the delay the valve 80 closes and valve 79 opens whereby clean treated water that passes through the membrane assembly 59 in the pressure vessel 58 is delivered to the storage tank 74. This opeation continues until a predetermined high level is reached in the storage tank at which time the level control 81 effects operation of relay 109 and interruption of the circuit whereby the pump 47 stops and the valve 50 closes. The solenoid valve 79 also closes and valve 80 opens.

The treating of the water for delivery to the storage tank 74 takes place only when there is demand therefor and the operation of the water dispensing portion has no affect on the treating portion unless there is a malfunction or actuation of the purity probe 87 which closes down the entire system. While the pump 47 is idle, the trickle of water through the orifice 51 of the valve 50 provides a flow that passes through the pump 47 and into the shell 58 of the unit 43 said water flowing from the shell 58 through the line 65 to the drain. This prevents accumulation of grime. The further assurance of only clean treated water passing to the storage tank 74 when the level control 81 actuates the relay 109 to start the pump 47 and open the valve 50 is the valve 79 remaining closed and the valve 80 being open for the first water from the collection area 61 of of the shell 58 to be discharged through the valve 80 to the drain. During continued operation of the pump, the rejected water delivered to the line 65 has a portion thereof recycled through the line 70 to the pump 47. If the flow controls 69 and 71 should become inoperative or stop the flow to the drain, a valve 115 and a bypass 116 will open so the rejected water can bypass the flow control 69 and move to the drain.

A suitable timer 117 is connected into the power system and arranged to effect a flushing operation of the filtration system at selected intervals. As for example, the timer 117 may operate at the end of twenty-four hours and provide a five minute purge. The timer 117 provides a circuit through a line 118 to a flush relay 119 which completes a circuit to the solenoid valve 50 and the motor 111 for the pump 47. The circuitry is such that valve 79 remains closed and valve 80 is open whereby for the flush period, water is moved through the pressure filtration system and membrane through the valve 80, check valve 78 to the line 65 for flowing to the drain. Also flush water will flow from the outlet 64 through the bypass 116 and 115 to the line 65 and drain. At the end of the flush period, the circuitry is returned to the position for normal operation. With this arrangement of flushing, if there is no call for water to be delivered to the storage tank during the period of 24 hours the flushing will clean the pressurized filtration system or reverse osmosis uniti whereby it is in condition for the next period to supply clean water when needed. While the structure is illustrated and described as a vending apparatus the same treatment apparatus may be used without the coin control mechanism with merely a switch or the like to initiate operation to provide clean substantially pure water.

It is to be understood that while the foregoing disclosure is one form of the invention, it is not to be limited to the specific form or arrangement of parts described and shown.

We claim:

1. A vending apparatus for dispensing water comprising:
    a. a housing having at least one dispensing station accessible from the exterior thereof;
    b. a closed treated water tank in the housing;
    c. a water treating means including a semipermeable membrane filtration structure operating under pressure to pass filtered water and reject impurites including solids and dissolved minerals, said treating means having a filtered water outlet in flow communication with the treated water tank for delivery of filtered water thereto;
    d. means connecting said membrane filtration structure to a disposal for transmittal of rejected water thereto;
    e. a flow line having an inlet connected to a source of raw water;
    f. a pump having an inlet connected to said flow line and an outlet connected to the water treating means to deliver raw water to the upstream side of said membrane filtration structure for treatment therein;
    g. a dispensing means for dispensing water at said dispensing station;
    h. means connecting the treated water tank to said dispensing means to transmit treated water from said tank to said dispensing means for dispensing;
    i. a coin operated means supported by said housing operative to control said dispensing means and effect delivery of a predetermined quantity of treated water in response to deposition of a coin of proper value;
    j. a carbon fiter between the treated water tank and said dispensing means and arranged whereby all water dispensed passes therethrough;
    k. means for detecting the purity of the treated water from the water treating means and operative for deactivating from dispensing means when impurities in the treated water exceed a predetermined level;
    l. a prefilter in said flow line upstream from said pump and operative to remove particles of solids from the raw water; and
    m. means responsive to differential pressure around said prefilter and operative to deactivate the dispensing means and pump if flow through the prefilter is retarded to a predetermined minimum.

2. A vending apparatus as set forth in claim 1, and including:
    a. a valve in said flow line upstream from said prefilter; and
    b. means responsive to water level in said closed treated water tank operative to open said valve and actuate said pump when the water level is a predetermined low and to deactivate said pump and close said valve when the said water level is at a predetermined high.

3. A vending apparatus as set forth in claim 2 and including:
    a. means associated with said valve in said flow line effecting a restricted flow of water to the water treating means on the inlet side of the membrane therein when said valve is closed; and
    b. means permitting said restricted flow of water to pass through the connection means for disposal of rejected water.

4. A vending apparatus as set forth in claim 3 and including:
    a. a valve controlled flow line having communication with said flow connection and the inlet of the pump for return of a portion of the rejected water for recycling when the pump is operating;
    b. a branch connection with the flow connection for treated water between the treating means and closed tank;
    c. means operable to direct flow of treated water from said treating means either to said closed tank or to the branch connection;
    d. said branch connection being for transmittal of water to a disposal; and
    e. timer control means operable to actuate said flow directing means at selected intervals and for predetermined time to direct water to said branch for disposal.

5. A vending apparatus for dispensing water comprising:

a. a housing having at least one dispensing station accessible from the extension thereof;
b. a closed treated water tank in the housing;
c. a water treating means including a semipermeable membrane filtration structure operating under pressure to pass filtered water and reject impurities including solids and dissolved minerals, said treating means having a filtered water outlet in flow communication with the treated water tank for delivery of filtered water thereto;
d. means connecting said membrane filtration structure to a disposal for transmittal of rejected water threto;
e. a flow line having an inlet connected to a source of raw water;
f. a pump having an inlet connected to said flow line and outlet connected to the water treating means to deliver raw water to the upstream side of said membrane filtration structure for treatment therein;
g. a dispensing means for dispensing water at said dispensing station;
h. means connecting the treated water tank to said dispensing means to transmit treated water from said tank to said dispensing means for dispensing;
i. a coin operated means supported by said housing operative to control said dispensing means and effect delivery of a predetermined quality of treated water in response to deposition of a coin of proper value;
j. means for controlling quantity of dissolved solids in the filtered water from the water treating means, said controlling means having a conductivity sensing means for sensing a change in dissolved solids level in said filtered water and operative to produce a signal when the dissolved solids content is above a predetermined level;
k. means respnsive to said responsive and operative to deactivate the dispensing means and visually indicate the apparatus is inoperative;
l. said dispensing station being in the housing and accessible from the exterior thereof;
m. a door for said dispensing station and permitting access thereto for location of a water receiving container when said door is open;
n. means operatively connected to the dispensing means to prevent dispensing of water when said door is open and permitting dispensing of water when said door is closed;
o. said dispensing means having a tubular flow member extending into said dispensing station and having an open discharge and positioned above a water receiving container position for delivery of treated water thereto in response to operation of said pump; and
p. a guard member having walls around the discharge end of the dispensing means and extending therebelow, said guard member having an opening in lower portion thereof aligned vertically with said open discharge end, said guard member opening being of a size and spaced from said open discharge end that said discharge end is protected from contact by foreign objects, and discharged water flows through said guard member opening to a receiving container without contact with said guard member.

6. A water dispensing apparatus comprising:
a. a housing having at least one dispensing station accessible from the exterior thereof;
b. a treated water tank in the housing;
c. a water treating means including a micronic membrane filtration structure operating under pressure to pass filtered water and reject impurities including solids and dissovled minerals, said treating means having a filtered water outlet in flow communication with the treated water tank for delivery of filtered water thereto;
d. means connecting said membrane filtration structure to a disposal for transmittal of rejected water thereto;
e. a flow line having an inlet connected to a source of raw water;
f. a pump having an inlet connected to said flow line and an outlet connected to the water treating means to deliver raw water to the upstream side of said membrane filtration structure for treatment therein;
g. a dispensing means for dispensing water at said dispensing station;
h. means connecting the treated water tank to said dispensing means to transmit treated water from said tank to said dispensing means for dispensing;
i. a prefilter in said flow line upstream from said pump and operative to remove particles of solids from the raw water; and
j. means responsive to differential pressure around said prefilter and operative to deactivate the dispensing means and pump if flow through the prefilter is retarded to a predetermined levle.

7. A water dispensing apparatus as set forth in claim 6 and including:
a. a carbon filter between the treated water tank and said dispensing means and arranged whereby all water dispensed passes therethrough; and
b. means for detecting the purity of the treated water from the water treating means and operative for deactivating the dispensing means when impurities in the treated water exceed a predetermined level.

* * * * *